United States Patent [19]

Brown et al.

[11] Patent Number: 5,004,883

[45] Date of Patent: Apr. 2, 1991

[54] METHOD OF FABRICATING PLURAL SHAPED PARTS FROM A WORKPIECE

[75] Inventors: Andrew F. Brown; Peter B. Webber, both of Whittier, Calif.

[73] Assignee: Calcor Space Facility, Inc., Whittier, Calif.

[21] Appl. No.: 416,961

[22] Filed: Oct. 4, 1989

[51] Int. Cl.⁵ .......................... B23H 7/06; B23H 9/00
[52] U.S. Cl. ...................................... 219/69.12; 83/36; 204/129.35; 219/69.17
[58] Field of Search ................... 219/69.12, 68, 69.17, 219/69.2, 121.67, 121.72, 121.85, 121.69; 204/129.35, 206, 224 M; 83/36

[56] References Cited

U.S. PATENT DOCUMENTS

| | | | |
|---|---|---|---|
| 3,689,387 | 9/1972 | Jumer | 204/129.35 |
| 3,816,272 | 6/1974 | Joslin | 204/129.35 |
| 4,547,646 | 10/1985 | Briffod | 219/69.12 |

FOREIGN PATENT DOCUMENTS

| | | | |
|---|---|---|---|
| 303535 | 2/1989 | European Pat. Off. | 219/68 |
| 56-82129 | 7/1981 | Japan | 219/69.12 |
| 264825 | 11/1987 | Japan | 219/69.17 |
| 63-7228 | 1/1988 | Japan | 219/69.12 |

*Primary Examiner*—Geoffrey S. Evans
*Attorney, Agent, or Firm*—Boniard I. Brown

[57] ABSTRACT

A method of fabricating multiple parts, especially multiple metal parts which are later joined to form an assembly such as a three piece jet engine mounting link assembly with triple load bearing redundancy, from a single workpiece by cutting the workpiece along two mutually perpendicular axes, preferably with an electrical discharge machining (EDM) wire, and electropolishing recast surfaces formed on the parts by the EDM cutting operation.

15 Claims, 2 Drawing Sheets

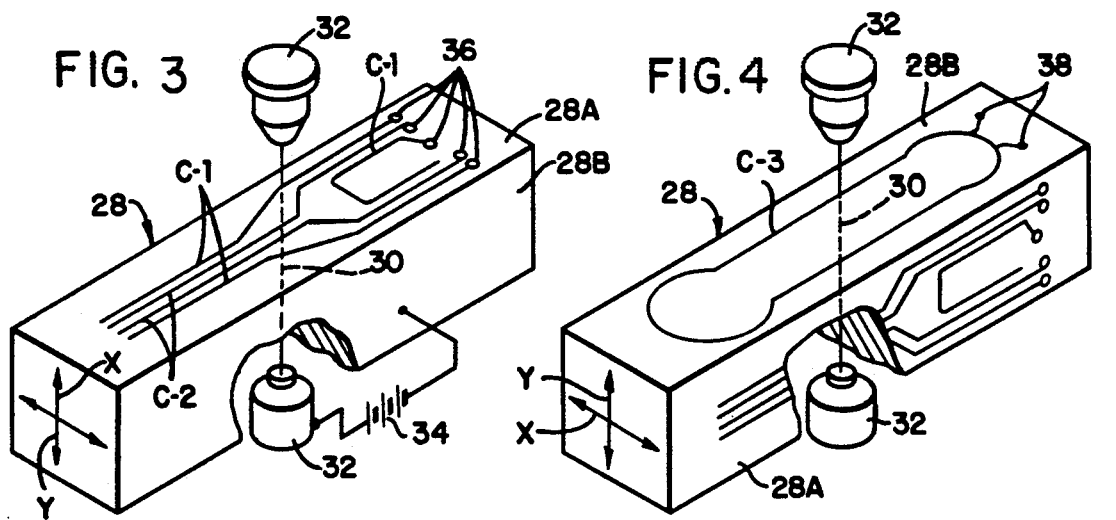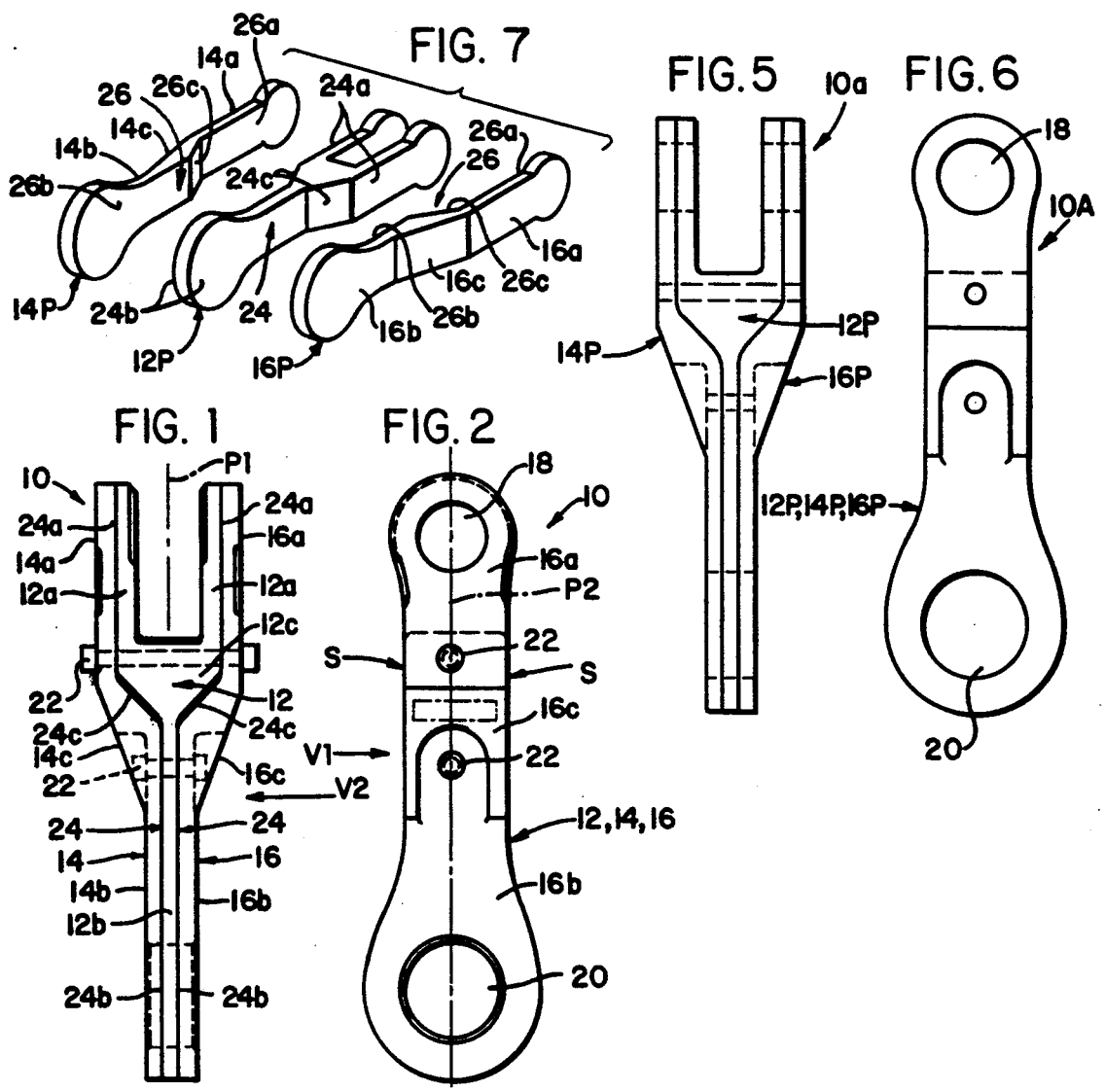

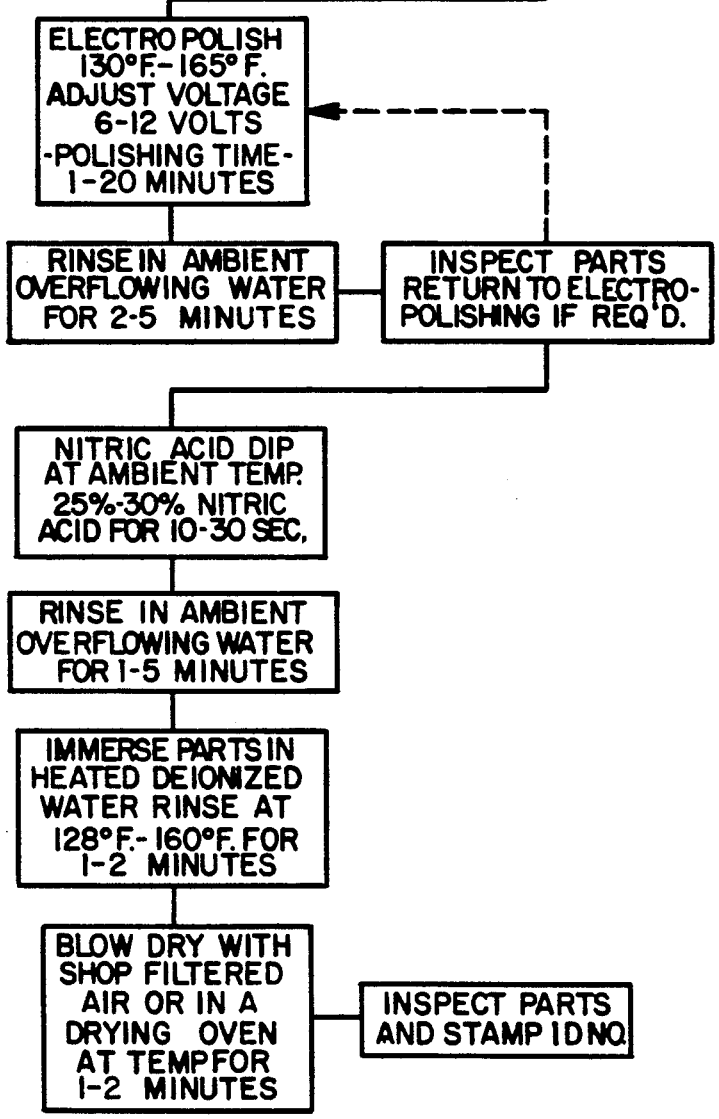
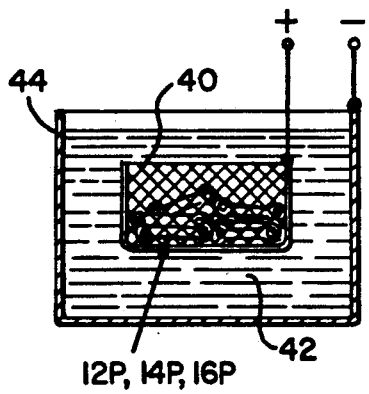
FIG. 8
FIG. 9

METHOD OF FABRICATING PLURAL SHAPED PARTS FROM A WORKPIECE

BACKGROUND OF THE INVENTION

1. Field of the Invention

This invention relates generally to the art of fabricating shaped parts by cutting a workpiece. The invention relates more particularly to a novel method of fabricating multiple parts, especially multiple metal parts which are later joined to form an assembly, from a single workpiece comprising only a fraction of material otherwise required, by cutting the workpiece along two mutually perpendicular axes, preferably with an electrical discharge machining (EDM) wire, and then removing the recast finish surfaces resulting from the electrical discharge machining operation, as by electropolishing to preclude the later origination of cracks at such surfaces during the service life of such parts as aircraft components.

2. Discussion of the Prior Art

It will become evident as the description proceeds that the fabricating method of the invention may be utilized to make a variety of parts. The invention is particularly suited for fabricating a three-piece, triple redundant jet engine mounting link for aircraft, however, and will be described in this context.

The aircraft link referred to is designed to serve as one of several mounting attachments for securing an aircraft jet engine to the engine supporting structure. The link is actually a three piece link assembly composed of three separate steel link members mutually joined in assembled relation in such a way as to provide a triple redundant load bearing support for a jet engine. This means that the link, or more correctly link assembly, is capable of safely performing its engine supporting function even though one or even two of its link members fail(s).

This engine support link or link assembly includes a center link member and two outer link members at opposite sides of the center member. The center link member is generally wishbone-shaped and has a pair of generally spaced parallel arms at one end and a single arm at the other end disposed in a plane passing midway between and parallel to the spaced arms of the member. This center link member has outer, essentially stepped side surfaces which extend in generally parallel relation along opposite sides of the single arm of the link member, then diverge outwardly away from one another at the juncture of the single arm and the parallel arms, and then extend, again in substantially parallel relation, along the outer sides of the parallel arms. Each outer link member has a generally stepped configuration and a stepped inner side surface which substantially complements and is disposed in mating face to face contact with the adjacent outer side surface of the center link member. In the ends of the link members are aligned bores to receive bolts, pins or the like for securing the link assembly to a jet engine and its supporting structure.

According to existing fabrication techniques, such a link assembly is fabricated by machining or otherwise forming its three link members from separate metal workpieces. These existing fabrication techniques have many disadvantages among the most serious of which are excessive material waste, excessive fabrication time, and relatively high fabrication cost.

One of the well known machining techniques which have been utilized in the fabrication of such link members as well as an endless variety of other parts is electrical discharge machining (EDM). EDM is well understood in the metal working art and hence need not be explained in elaborate detail in this disclosure. Suffice it to say the fabrication of a metal part by EDM involves the use of an electrically conductive machining implement of some type and a metal workpiece from which the metal part is to be fabricated. A high EDM voltage is impressed between the implement and the workpiece such that relative movement of the implement and workpiece against one another is effective to melt or vaporize the metal in contact with the implement and thus permit the implement to pass or cut through the workpiece. The workpiece may be cut to any desired shape by effecting relative movement of the EDM cutting implement along an appropriate cutting path with respect to the workpiece while the EDM voltage is impressed between them. High intensity lasers can also be used for this purpose.

One type of EDM cutting implement is a wire which has a continuously moving portion which extends between spaced guides and which engages the workpiece. A workpiece is cut by impressing a voltage between the wire and workpiece while relatively moving the wire and workpiece in such a way that the portion of the wire between the collets presses laterally against and moves along a desired path through the workpiece. If an inside cut is to be made in a workpiece, that is, a cut which does not open through the outer perimeter of the workpiece, a hole is first drilled through the workpiece at an appropriate starting position for the cut, and the EDM wire is inserted through the hole.

The surfaces of cuts made in a workpiece by an EDM wire, laser, or in any other way are referred to herein as "cut surfaces". Cuts made by an EDM cutting wire or laser have cut surfaces which are referred to in the art as "recast surfaces". These recast surfaces are actually relatively thin recast surface layers and have a relatively rough texture similar to sandpaper. When necessary, such recast surfaces are commonly machined to the desired smoothness, in order to insure against the propagation of cracks which can be initiated at a rough surface during service life. Rough surfaces or edges are therefore not acceptable in such applications as aircraft components.

SUMMARY OF THE INVENTION

In its broader aspects, this invention is concerned with fabricating, from a single workpiece, separate parts which are designed to be joined in assembled relation to form an assembly having two opposite sides and wherein (a) the parts have certain adjacent confronting side surfaces, referred to herein as associated surfaces, which extend between said opposite sides of the assembly normal to these sides and are disposed in face-to-face relation, (b) the assembled parts have first outlines when viewed in a first direction parallel to these associated surfaces, and (c) the assembled parts have coincident second outlines when viewed in a second direction normal to the first viewing direction. According to this aspect of the invention, the workpiece is initially cut in the direction of a first axis of the workpiece and along lines within a plane normal to such axis conforming to the outlines of the assembled parts when viewed in one of the above viewing directions. The workpiece cuts are interrupted in such a way that the portions of the workpiece between the cuts remain integrally joined to the remainder of the workpiece. The workpiece is then cut in the direction of a second axis of the workpiece normal to the first axis and along lines within a plane normal to the second axis conforming to the outlines of the assembled parts when viewed in the second viewing direction. The cuts made in this second cutting step intersect those made in the first cutting step in such a way as to cut the workpiece into separate shaped pieces conforming closely to the assembled parts, respectively. According to the preferred practice of the invention, the first cuts made are those which form the associated, adjacent confronting side surfaces of the parts.

The disclosed practice of the invention is concerned with fabricating the three link members of a triple redundant jet engine mounting link assembly of the kind discussed earlier, from a single metal workpiece by cutting the workpiece in the manner described above with an electrical discharge machining (EDM) wire. The associated surfaces of these link members have complementary shapes and are disposed in face-to-face mating contact in the finished link assembly. In this disclosed practice, the workpiece is cut with an EDM cutting wire into shaped pieces which conform closely to the finished link members, respectively, and in such a way that each pair of complementary associated surfaces of the pieces which are disposed in face-to-face mating relation in the finished link assembly are formed by a single EDM wire cut through the workpiece.

The fabrication of the multiple members or parts of complementary shaped members from a single metal workpiece, typically requires only a fraction of the material otherwise required, thus avoiding substantial material expense.

Another aspect of the invention is concerned with smoothing or polishing relatively rough "recast" surfaces which are formed on metal parts, such as the link members of the disclosed link assembly, made by cutting a metal workpiece with an EDM cutting implement, such as an EDM wire, or a laser. According to this aspect of the invention, such recast-surfaced parts are electropolished to remove their recast surfaces to insure against initiation and propagation of any cracks from such rough surfaces, as can occur under stress during the service life of parts.

BRIEF DESCRIPTION OF THE DRAWINGS

FIG. 1 is a plan view of a three piece jet engine mounting link assembly whose link members which have been fabricated from a single workpiece in accordance with this invention;

FIG. 2 is a side elevation of the link assembly;

FIG. 3 illustrates an initial step of the present method of fabricating the three link members of the link assembly;

FIG. 4 illustrates a second step of the present method of fabricating the three link members of the link assembly;

FIG. 5 is a plan view of an initially shaped intermediate product produced by the fabrication steps of FIGS. 3 and 4;

FIG. 6 is a side elevation of the intermediate product of FIG. 5;

FIG. 7 is an exploded perspective view of three shaped pieces which make up the intermediate product of FIGS. 5 and 6;

FIG. 8 is a flow diagram of a third, electropolishing step of the present method of fabricating the three link members of the link assembly; and FIG. 9 illustrates electropolishing apparatus used in the electropolishing step of FIG. 8.

DESCRIPTION OF THE PREFERRED PRACTICE OF THE INVENTION

Referring now to the drawings and first to FIGS. 1 and 2, there is illustrated a three piece jet engine mounting link assembly 10 of the kind mentioned earlier whose members are fabricated in accordance with this invention. This link assembly is designed for use as one of several engine mounts for attaching a jet aircraft engine to its supporting structure. The link assembly includes three link members 12, 14, 16 which contain aligned bores 18, 20 having parallel axes and are joined in their illustrated assembled relation by fasteners 22, such as aircraft bolts. The link assembly is characterized by triple load bearing redundancy. That is to say, the link assembly is so designed that it will continue to perform its engine supporting function even though one or even two of its link members 12, 14, 16 fail(s).

The link assembly 10 itself forms no part of this invention. Accordingly, it is neccessary to describe the assembly only in sufficient detail to enable a full and complete understanding of the invention. Suffice it to say that the link member 12 is a generally wishbone-shaped center link member having a pair of relatively flat, spaced parallel arms 12a at one end, a single relatively flat arm 12b at the other end, and a central tapered juncture between the arms 12a, 12b. These arms are disposed in substantially parallel planes normal to two opposite sides of the link assembly, namely the right and left sides S of the assembly as viewed in FIG. 2. The plane P1 in FIG. 1 of the single arm 12b is located about midway between the planes of the two parallel arms 12a. The arms have longitudinal centerlines disposed in a common plane P2 in FIG. 2 normal to the parallel planes of the arms and containing the axes of the bores 18, 20. The center link member 12 has generally stepped outer side surfaces 24 extending between and normal to the opposite assembly sides S. These side surfaces include flat surface end portions 24a and 24b along the outer sides of the link arms 12a and 12b, respectively, and intervening sloping surface portions 24c along the outer sides of the juncture 12c.

The two outer link members 14, 16 have relatively flat, offset end portions 14a, 16a, 14b, 16b, respectively, intervening sloping mid-portions 14c, 16c, and generally stepped inner surfaces 26. These inner side surfaces 26 of the outer link members 14, 16 extend between and substantially normal to the opposite sides S of the link assembly 10 and substantially complement and are disposed in face-to-face mating contact with their adjacent side surfaces 24 of the center link member 12. Thus, the inner side surfaces 26 of the outer link members have flat surface end portions 26a, 26b facing and contacting the side surface end portions 24a, 24b, respectively, of the center link member 12 and intervening sloping surface portions 26c disposed in close confronting relation to the sloping side surface portions 24c, respectively, of the center link member. Each side surface 24 of the center link member 12 and its facing or contacting side surface 26 of the adjacent side link member 14 or 16, as the case may be, are referred to herein as associated surfaces of the link members.

The assembled link members 12, 14, 16 have outlines, as viewed in a direction V1 parallel to the side surfaces 24, 26 of the members and normal to the plane P2 of the link assembly 10 in FIG. 2, which are the outlines of the members in the plan view of FIG. 1. The assembled link members have coincident outlines as viewed in a direction V2 normal to the viewing direction V1 and to the plane P1 of the link assembly in figure 1, which are the coincident outlines of the members in the side view of FIG. 2.

This invention provides a novel method of fabricating the link members 12, 14, 16 of the link assembly 10 from a single workpiece 28. According to the preferred practice of this method, the workpiece 28 is first cut in the manner shown in FIG. 3 and then at right angles as shown in FIG. 4 into three separate shaped pieces 12p, 14p, 16p (FIGS. 5, 6, 7) corresponding to the link members 12, 14, 16, respectively. The first workpiece cut of FIG. 3 occurs in the direction of a first axis X of the workpiece 28 and along lines C-1 and C-2 within a plane normal to the X axis. Taken together, these lines conform to the outlines of the assembled link members 12, 14, 16 as viewed in the direction V1 in FIG. 2 parallel to their side surfaces 24, 26 and normal to the plane P2 of the link assembly 10. The cutting lines C-1, C-2 thus conform to the outlines of the assembled link members as they appear in the plan view of FIG. 1. Cutting lines C-1 conform to the outline of the link assembly as a whole, and cutting lines C-2 conform to the associated complementary side faces 24, 26 of the assembled link members 12, 14, 16.

The second workpiece cut illustrated in FIG. 4 occurs in the direction of a second axis Y of the workpiece 28 normal to the X axis and along lines C-3 within a plane normal to the second axis Y. Lines C-3 define a closed figure and conform to the coincident outlines of the assembled link members, as viewed in the direction V2 in FIG. 1, normal to the viewing direction V1 and to the plane P1 of the link assembly 10. These latter coincident outlines of the assembled link members conform to the outline of the link assembly as it is viewed in side elevation in FIG. 2. The second cut along the lines C-3 intersects the first cuts along the lines C-1, C-2 to form the shaped intermediate work product 10A of FIGS. 5 and 6. This intermediate work product consists of the three separate, shaped intermediate work pieces 12p, 14p, 16p, which conform closely to the finished link members 12, 14, 16, respectively, disposed in the same side-by-side relation as the link members have in the link assembly 10.

The shaped intermediate work pieces 12p, 14p, 18p are machined and/or otherwise finished as necessary to form the finished link members 12, 14, 16. These finished link members are then assembled side by side and joined by the bolts 22 or the like to form the finished link assembly 10. The bores 18, 20 may be formed by drilling the workpiece 28 before or after the first workpiece cutting step of FIG. 3 or by drilling the separate workpieces 12p, 14p, 16p after the second workpiece cutting step of FIG. 4.

At this point, attention is directed to certain unique and important features of the link member fabrication method described to this point. One feature resides in the fact that each pair of associated complementary side surfaces 24, 26 of the link members 12, 14, 16 are formed or cut simultaneously by a single cut through the workpiece 28. That is to say, each cut along a cutting line C-2 in FIG. 3 simultaneously forms the associated complementary side surfaces 24, 26 of the center and outer link members 12, 14 or 12, 16, as the case may be. Another feature resides in the fact that the cutting lines C-1 and C-2 in FIG. 3, and hence also the initial cuts made along these lines are interrupted in that they have closed ends which do not intersect one another. Accordingly, the workpiece portions or sections between these cuts remain integrally joined to the rest of the workpiece 28 to permit the final cut to be made along the lines C-3 in FIG. 4 without having to take special steps to retain the latter workpiece sections in place in the remainder of the workpiece. The initial cuts made along the paths C-1, C-2 extend slightly beyond the path C-3 of the final cut, whereby this final cut intersects all of the initial cuts in such a way as to cut the workpiece 28 into the separate intermediate work pieces 12p, 14p, 16p.

The link members 12, 14, 16 of a typical aircraft link assembly are fabricated from a steel known as INCONEL. The preferred INCONEL workpiece 28 for use in the practice of this invention has the shape of a rectangular block with flat, mutually perpendicular faces 28A and 28B, as shown in FIGS. 3 and 4. The X and Y axes along which the block is cut in FIGS. 3 and 4 are normal to these block faces, respectively. According to the preferred practice of the invention, lines corresponding to the cutting lines C-1, C-2 and C-3 are placed on the block faces 28A, 28B for use as a guide during the workpiece cutting steps of FIGS. 3 and 4.

The workpiece cutting steps of FIGS. 3 and 4 are performed on the INCONEL workpiece 28 by electrical discharge machining (EDM) utilizing an EDM wire 30. This wire is gripped at its ends by collets 32 mounted on a supporting structure (not shown) in such a way that the wire is stressed in tension between the collets. The workpiece 28 is mounted on another supporting structure (not shown). A high EDM voltage from a source 34 is impressed between the workpiece 28 and the EDM wire 30 in any convenient way. The magnitude of this voltage is such that contact of the wire with the workpiece fuses or vaporizes the workpiece metal in contact with the wire, whereby the workpiece can be cut by continuously urging the workpiece and wire against one another.

In order to permit cutting of the workpiece 28 with the EDM wire 30 along the cutting lines C-1, C-2, and C-3, holes 36, 38 are drilled through the workpiece 28 through which the wire can be inserted. Holes 36 extend parallel to the X axis of the workpiece and hence normal to its face 28A and are located at ends of the cutting lines C-1 and C-2. Holes 38 extend parallel to its Y axis and hence normal to its side face 28B. The workpiece is cut along the lines C-1, C-2 in succession by inserting the EDM wire through each of the holes 36 and then effecting relative movement of the workpiece and wire with the wire disposed normal to the workpiece face 28A, while impressing an EDM voltage between the workpiece and wire in such a way that the relative movement of the wire with respect to the workpiece occurs along the corresponding cutting line C-1, C-2, or C-3, as the case may be. Thereafter, the workpiece is cut along cutting lines C-3 by inserting the EDM wire 30 through the hole 38 and effecting relative movement of the workpiece and wire with the wire disposed normal to the workpiece face 28B while again impressing an EDM voltage between the workpiece and wire in such a way that the relative movement of the wire with respect to the workpiece occurs along the cutting lines C-3.

The cuts produced by the above EDM wire cutting of the INCONEL workpiece 28 to form the shaped intermediate work pieces 12p, 14p, 16p produce on these pieces the so-called recast cut surfaces or surface layers referred to earlier. These recast surfaces are relatively rough and must be smoothed or polished before the finished link members 12, 14, 16 are joined to form the link assembly 10. The final step of this invention involves electropolishing the EDM wire cut, and hence recast surfaces of the intermediate work pieces, preferably to a depth sufficient to remove most or all of the recast surface layers. FIG. 8 is a flow diagram of this electropolishing procedure, and FIG. 9 illustrates apparatus used in the procedure. Except for its use to polish recast surfaces in accordance with this invention, the electropolishing procedure and apparatus are well known and hence need be described only in sufficient detail to enable a full and complete understanding of this invention.

With this in mind, the electropolishing procedure of FIG. 8 involves placement of the intermediate workpiece parts 12p, 14p, 16p in a wire basket 40 and then degreasing and alkaline cleaning the parts if neccessary. Degreasing may be performed by immersing the parts in a vapor degreaser. The degreased parts are cleaned by immersion for about 5 to 20 minutes in an alkaline steel cleaning solution, such as that marketed by the Diversey-Wyandotte Co. under the trade name NUVAT, at a temperature of about 130-170 degrees F. If the parts have any areas which are not to be electropolished for some reason, these areas are masked off in any convenient way, as with SCOTCH 470 electroplating masking tape.

The parts 12p, 14p, 16p are then electropolished by immersion in an electropolishing solution or electrolyte 42 (FIG. 9), such as that marketed under the trade name ELECTRO-GLO 300 by the Electro-Glo Corp., at a temperature of about 130-165 degrees F. and impression of a D.C. voltage of about 6 to 12 volts between the solution and the parts with the positive voltage applied to the parts. In FIG. 9 this is accomplished by applying the positive D.C. voltage to the wire basket 40 holding the parts, and the negative D.C. voltage to a metal tank 44 containing the electrolyte 42. In electropolishing, which is essentially the reverse of electroplating, products of anodic metal dissolution from the parts being polished react with the electrolyte to form a film over the exposed surfaces of the parts including their recast surfaces 24, 26. This film conforms to the macro-contour of the part surfaces rather than to the micro-contour of these surfaces, and results in the film being thinner over microprojections on such recast surfaces than over microdepressions in the recast surfaces. The end effect of this condition is more rapid dissolution of the microprojections and resultant microleveling of the recast surfaces. This electropolishing step is preferably continued to substantialy the depth of the recast surface layers.

After completion of the electropolishing procedure, the parts 12p, 14p, 16p are rinsed in water for as long as neccessary to clean their surfaces. The parts are then dipped in 25% to 30% nitric acid solution for about 1 to 2 minutes, then rinsed in tap water for about 1 to 5 minutes, then immersed in deionized water at a temperature of about 128 to 185 degrees F., and finally blown dry. The parts are then further machined or otherwise worked as desired and joined to form the finished link assembly 10.

I claim as my invention:
1. In a method of forming separate parts from a single workpiece, the steps of:
   (1) cutting said workpiece in the direction of a first axis of the workpiece and along interrupted lines in a plane normal to said first workpiece axis conforming substantially to certain part outlines in such a way that the workpiece sections between the cuts remain integrally joined to the remainder of the workpiece, and
   (2) thereafter cutting said workpiece in the direction of a second axis normal to said first workpiece axis and along lines in a plane normal to said second workpiece axis conforming substantially to certain other part outlines in such a way that the cuts made in this cutting step (2) intersect all of the cuts made in cutting step (1) so as to form separate shaped pieces separated from one another and from the remainder of the workpiece and having outlines when viewed in certain mutually perpendicular directions conforming substantially to said certain part outlines, respectively.

2. A method according to claim 1 wherein:
each said part has a surface complemental to a surface of another part, and
said method comprises the additional step of forming each pair of complementary surfaces by a single cut through the workpiece.

3. A method according to claim 1 wherein:
said workpiece is a metal workpiece,
said cutting steps (1) and (2) are performed by cutting the workpiece with an EDM wire to produce cuts having relatively rough recast surfaces, and
said method comprises the additional step of electropolishing said recast surfaces.

4. A method according to claim 3 wherein:
each said part has a surface complemental to a surface of another part, and
said method comprises the additional step of forming each pair of complementary surfaces by a single cut through the workpiece.

5. In a method of forming separate parts from a single workpiece, which parts are adapted to be mutually joined to form an assembly having two opposite sides and wherein (a) the parts have side surfaces extending between and normal to said opposite assembly sides, (b) each said side surface of each part is disposed in face-to-face relation to a side surface of another part to form a pair of associated side surfaces, and (c) the assembled parts have first outlines when viewed in a first direction parallel to said side surfaces and coincident second outlines when viewed in a second direction normal to said first viewing direction, the steps of:
   (1) cutting said workpiece in the direction of a first axis of the workpiece and along interrupted lines in a plane normal to said first workpiece axis conforming substantially to the outlines of the assembled parts when viewed in one of said viewing directions, and
   (2) thereafter cutting said workpiece in the direction of a second axis of the workpiece normal to said first workpiece axis and along lines in a plane normal to said second workpiece axis conforming substantially to the outlines of the assembled parts when viewed in the other of said viewing directions in such a way that the cuts made in this cutting step (2) intersect all of the cuts made in cutting step (1) so as to form separate shaped pieces separated from one another and from the remainder of the workpiece and having outlines when viewed in certain mutually perpendicular directions conforming substantially to said outlines of said assembly parts when viewed in said first and second viewing directions, respectively.

6. A method according to claim 5 wherein:
the interrupted lines along which said workpiece is cut in said cutting step (1) conform substantially to the outlines of said parts when viewed in said first direction.

7. A method according to claim 6 wherein:
said cutting step (1) involves forming each pair of said associated side surfaces of said parts by a single cut through the workpiece.

8. A method according to claim 5, wherein:
said workpiece is a metal workpiece,
said cutting steps (1) and (2) are performed by cutting the workpiece with an electrical discharge machining wire which produces cuts having relatively rough recast surfaces, and
said method comprises the additional step of electropolishing said recast surfaces.

9. A method according to claim 8 wherein:
the interrupted lines along which said workpiece is cut in said cutting step (1) conform substantially to the outlines of said parts when viewed in said first direction, and
said cutting step (2) involves forming each pair of said associated side surfaces of said parts by a single cut through the workpiece.

10. A method according to claim 9, wherein:
said workpiece has planar faces normal to said first and second workpiece axes, respectively,
said wire remains substantially normal to said workpiece faces during said cutting steps (1) and (2), and
said method includes the additional step of placing on said workpiece faces prior to said cutting steps (1) and (2) guide lines conforming substantially to said outlines of said assembled parts when viewed in said first and second directions, respectively, for use in guiding said wire during said cutting steps (1) and (2).

11. A method of forming separate parts from a single metal workpiece, which parts are adapted to be mutually joined to form an assembly having two opposite sides and wherein (a) the parts have side surfaces extending between and normal to said opposite assembly sides, (b) each said side surface of each part is disposed in face-to-face relation to a side surface of another part to form a pair of associated side surfaces, and (c) the assembled parts have first outlines when viewed in a first direction parallel to said side surfaces and coincident second outlines when viewed in a second direction normal to said first viewing direction, the steps of:
(1) providing an electrical discharge machining wire,
(2) impressing between said wire and said workpiece an electrical voltage sufficient to enable said wire to cut through said workpiece by relative movement of said wire and workpiece against one another,
(3) effecting relative movement of said wire and said workpiece in such a way that said wire remains substantially normal to a first axis of the workpiece and relative movement of said wire with respect to said workpiece occurs laterally of said wire and along interrupted lines in a plane normal to said first workpiece axis conforming substantially to the outlines of the assembled parts when viewed in said first viewing direction, thereby to cut said workpiece along said lines, and
(4) effecting relative movement of said wire and said workpiece in such a way that said wire remains substantially parallel to a second axis of the workpiece normal to said first workpiece axis and relative movement of said wire with respect to said workpiece occurs laterally of said wire and along lines in a second plane normal to said second axis conforming substantially to the outlines of the assembled parts when viewed in said second viewing direction, thereby to cut said workpiece along said latter lines in such a way that the cuts made in this cutting step (4) intersect all of the cuts made in cutting step (3) so as to form separate shaped metal pieces separated from one another and from the remainder of the workpiece and having outlines when viewed in certain mutually perpendicular planes conforming substantially to those of said assembly parts when viewed in said first and second directions, respectively.

12. A method according to claim 11, wherein:
the cuts formed on said shaped pieces by said cutting steps (3) and (4) have relatively rough recast surfaces, and
said method comprises the additional step of electropolishing said cut surfaces.

13. A method according to claim 12, wherein:
said workpiece has first and second planar faces normal to said first and second workpiece axes, respectively,
said wire remains substantially normal to said first workpiece face during said cutting step (3) and normal to said second workpiece face during said cutting step (4), and
said method comprises the additional step of placing on said workpiece faces prior to said cutting steps (3) and (4) guide lines conforming substantially to said outlines of said assembled parts when viewed in said first and second viewing directions, respectively, for use in guiding said wire during said cutting steps (3) and (4).

14. In a method of fabricating metal link members for a link assembly having two opposite sides and comprising two outer link members and a generally wishbone-shaped center link member between and joined to the outer link members, and wherein (a) said center link member has two spaced, relatively flat and parallel arms at one end and a single relatively flat arm at the other end disposed in substantially parallel planes normal to said opposite sides of said link assembly and having longitudinal centerlines disposed in a common plane substantially normal to said parallel planes, (b) the plane of said single arm is located substantially midway between said parallel arms, (c) said center link member has generally stepped outer side surfaces at the outer sides of said arms extending be&ween said opposite sides of said link assembly normal to said common plane, (d) each outer link member has an inner side surface extending between said opposite sides of said link assembly normal to said common plane and complementing the adjacent outer side surface of said center link member, (e) each pair of adjacent complementary side surfaces of the center and outer link members are disposed in face-to-face mating contact and constitute a pair of associated side surfaces, and (f) the assembled link members have first outlines when viewed in a first direction normal to said common plane and coincident second outlines when viewed in a second direction normal to said parallel planes, the steps of:

(1) providing a metal workpiece and an electrical discharge machining wire, (2) impressing between said wire and said workpiece an electrical voltage sufficient to enable said wire to cut through said workpiece by relative movement of said wire and workpiece against one another, (3) effecting relative movement of said wire and said workpiece in such a way that said wire remains substantially normal to a first axis of the workpiece and relative movement of said wire with respect to said workpiece occurs laterally of said wire and along interrupted lines in a plane normal to said first workpiece axis conforming substantially to the outlines of the assembled link members when viewed in said first viewing direction, thereby to cut the workpiece along said lines in such a way that the workpiece sections between the cuts remain integrally joined to the remainder of the workpiece, (4) thereafter effecting relative movement of said wire and said workpiece in such a way that said wire remains substantially parallel to a second axis of the workpiece normal to said first workpiece axis and relative movement of said wire with respect to said workpiece occurs laterally of said wire and, along lines in a plane normal to said second workpiece axis conforming substantially to the outlines of the assembled link members when viewed in said second viewing direction, thereby to cut the workpiece along the latter lines in such a way that the cuts made in this cutting step (4) intersect all of the cuts made in cutting step (3) so as to form separate shaped metal pieces separated from one another and from the remainder of the workpiece and having shapes conforming substantially to those of said link members, respectively and cut surfaces corresponding to each pair of said associated side surfaces of the assembled link members, and wherein said cut surfaces corresponding to each pair of said associated side surfaces are formed by a single cut of said wire through said workpiece, said cut surfaces comprise relatively rough recast surfaces, and said method comprises the additional step of electropolishing said recast surfaces.

15. A method according to claim 14, wherein:

said workpiece has first and second planar faces normal to said first and second workpiece axes, respectively, said wire remains substantially normal to said first workpiece face during said cutting step (3) and normal to said second workpiece face during said cutting step (4), and said method comprises the additional step of pacing on said workpiece faces prior to said cutting steps (3) and (4) guide lines conforming substantially to said outlines of said assembled link members when viewed in said first and second viewing directions, respectively, for use in guiding said wire during said cutting steps (3) and (4).

* * * * *